(12) United States Patent
Russ et al.

(10) Patent No.: US 8,908,035 B2
(45) Date of Patent: Dec. 9, 2014

(54) METHOD OF PRODUCING A TOTAL IMAGE OF THE ENVIRONMENT SURROUNDING A MOTOR VEHICLE

(75) Inventors: Artur Russ, Weilheim (DE); Renaud Debon, Munich (DE); Sascha Bembenek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 425 days.

(21) Appl. No.: 12/437,140

(22) Filed: May 7, 2009

(65) Prior Publication Data
US 2009/0273674 A1 Nov. 5, 2009

Related U.S. Application Data

(63) Continuation of application No. PCT/EP2007/009587, filed on Nov. 6, 2007.

(30) Foreign Application Priority Data

Nov. 9, 2006 (DE) .......................... 10 2006 052 779

(51) Int. Cl.
*H04N 7/18* (2006.01)
*B60R 1/00* (2006.01)

(52) U.S. Cl.
CPC ............ *H04N 7/18* (2013.01); *B60R 2300/303* (2013.01); *B60R 2300/8093* (2013.01); *B60R 2300/607* (2013.01); *B60R 2300/105* (2013.01); *B60R 1/00* (2013.01); *B60R 2300/301* (2013.01)
USPC ......................................... 348/148; 348/113

(58) Field of Classification Search
USPC ................... 348/148, 113; 340/435, 522, 148
See application file for complete search history.

(56) References Cited

U.S. PATENT DOCUMENTS 5,495,576 A * 2/1996 Ritchey .......................... 345/420
5,767,793 A * 6/1998 Agravante et al. ............. 340/903
5,805,939 A * 9/1998 Hamamura et al. .......... 396/123

(Continued)

FOREIGN PATENT DOCUMENTS

DE          199 47 766 A1      5/2001
DE   10 2005 023 461 A1    12/2005

(Continued)

OTHER PUBLICATIONS

German Search Report dated May 11, 2009 including English translation (Eleven (11) pages).

*Primary Examiner* — Madhu Woolcock
(74) *Attorney, Agent, or Firm* — Crowell & Moring LLP

(57) ABSTRACT

A method of producing a total image of the surrounding environment of a motor vehicle uses an image sensor device connected with the motor vehicle, which supplies image data in a first acquisition range of the vehicle environment. At least a first image part of the total image is based on image data of the image sensor device from the first acquisition range. In addition to the image sensor device, a distance sensor device connected with the motor vehicle is used which supplies distance data in a second acquisition range of the vehicle environment, the second acquisition range covering an additional range of the vehicle environment which is not covered by the first acquisition range. At least a second image part of the total image, which is at least partially situated outside the first image part, is based on the distance data of the distance sensor device from the additional range.

12 Claims, 2 Drawing Sheets

(56) References Cited

U.S. PATENT DOCUMENTS

| | | | |
|---|---|---|---|
| 5,963,664 A * | 10/1999 | Kumar et al. | 382/154 |
| 5,974,876 A * | 11/1999 | Hijikata et al. | 73/178 R |
| 6,498,620 B2 * | 12/2002 | Schofield et al. | 348/148 |
| 6,580,385 B1 * | 6/2003 | Winner et al. | 342/70 |
| 6,693,524 B1 * | 2/2004 | Payne | 340/463 |
| 6,693,583 B2 * | 2/2004 | Tamatsu et al. | 342/70 |
| 6,828,903 B2 * | 12/2004 | Watanabe et al. | 340/435 |
| 6,873,911 B2 * | 3/2005 | Nishira et al. | 701/301 |
| 6,898,331 B2 * | 5/2005 | Tiana | 382/274 |
| 6,919,917 B1 | 7/2005 | Janssen | |
| 6,958,770 B2 * | 10/2005 | Okada et al. | 348/149 |
| 7,079,173 B2 * | 7/2006 | Jouppi | 348/36 |
| 7,106,183 B2 * | 9/2006 | Hong | 340/435 |
| 7,106,421 B2 * | 9/2006 | Matsuura et al. | 356/4.01 |
| 7,149,608 B2 * | 12/2006 | Itoh et al. | 701/1 |
| 7,180,476 B1 * | 2/2007 | Guell et al. | 345/7 |
| 7,224,382 B2 * | 5/2007 | Baker | 348/46 |
| 7,251,346 B2 * | 7/2007 | Higaki et al. | 382/106 |
| 7,266,219 B2 * | 9/2007 | Okamoto et al. | 382/104 |
| 7,283,211 B2 * | 10/2007 | Yamamoto et al. | 356/4.03 |
| 7,386,226 B2 * | 6/2008 | Miyoshi et al. | 396/89 |
| 7,400,266 B2 * | 7/2008 | Haug | 340/903 |
| 7,436,429 B2 * | 10/2008 | Tillotson | 348/36 |
| 7,460,951 B2 * | 12/2008 | Altan et al. | 701/536 |
| 7,576,767 B2 * | 8/2009 | Lee et al. | 348/36 |
| 7,583,182 B2 * | 9/2009 | Wang et al. | 340/436 |
| 7,593,057 B2 * | 9/2009 | Yee et al. | 348/373 |
| 7,598,887 B2 * | 10/2009 | Sato et al. | 340/932.2 |
| 7,660,659 B2 * | 2/2010 | Watanabe et al. | 701/96 |
| 7,739,046 B2 * | 6/2010 | Satonaka et al. | 701/300 |
| 7,834,910 B2 * | 11/2010 | DeLorme et al. | 348/218.1 |
| 7,894,631 B2 * | 2/2011 | Kakinami | 382/103 |
| 7,904,222 B2 * | 3/2011 | Lee et al. | 701/41 |
| 7,917,258 B2 * | 3/2011 | Goubault et al. | 701/21 |
| 8,013,889 B1 * | 9/2011 | Hong et al. | 348/148 |
| 8,108,097 B2 * | 1/2012 | Mattes et al. | 701/36 |
| 8,315,433 B2 * | 11/2012 | Hsu et al. | 382/104 |
| 2002/0067292 A1 * | 6/2002 | Appenrodt et al. | 340/988 |
| 2002/0145662 A1 * | 10/2002 | Mizusawa et al. | 348/118 |
| 2002/0169537 A1 * | 11/2002 | Regensburger et al. | 701/96 |
| 2003/0128436 A1 * | 7/2003 | Ishii et al. | 359/630 |
| 2003/0179084 A1 * | 9/2003 | Skrbina et al. | 340/435 |
| 2004/0047518 A1 * | 3/2004 | Tiana | 382/284 |
| 2005/0021201 A1 * | 1/2005 | Klotz et al. | 701/35 |
| 2005/0231341 A1 * | 10/2005 | Shimizu | 340/436 |
| 2005/0270500 A1 | 12/2005 | Ito | |
| 2006/0018509 A1 * | 1/2006 | Miyoshi et al. | 382/104 |
| 2006/0091653 A1 * | 5/2006 | De Mersseman et al. | 280/735 |
| 2006/0158647 A1 * | 7/2006 | Yao | 356/326 |
| 2006/0187333 A1 * | 8/2006 | Kobayashi et al. | 348/333.01 |
| 2007/0003108 A1 * | 1/2007 | Chinomi et al. | 382/104 |
| 2007/0085901 A1 * | 4/2007 | Yang et al. | 348/47 |
| 2007/0109406 A1 * | 5/2007 | Schofield et al. | 348/116 |
| 2007/0120656 A1 * | 5/2007 | Nakanishi et al. | 340/435 |
| 2008/0036878 A1 * | 2/2008 | Schmid et al. | 348/231.99 |
| 2008/0187047 A1 * | 8/2008 | Stephan et al. | 375/240.16 |
| 2008/0231702 A1 * | 9/2008 | Matsumoto et al. | 348/148 |
| 2008/0239078 A1 * | 10/2008 | Mohr et al. | 348/148 |
| 2009/0022423 A1 * | 1/2009 | Ehlgen et al. | 382/284 |
| 2010/0007476 A1 * | 1/2010 | Klotz et al. | 340/425.5 |
| 2010/0045448 A1 * | 2/2010 | Kakinami | 340/435 |
| 2011/0169957 A1 * | 7/2011 | Bartz | 348/149 |
| 2012/0194355 A1 * | 8/2012 | Thomas et al. | 340/932.2 |

FOREIGN PATENT DOCUMENTS

| | | |
|---|---|---|
| DE | 10 2006 020 930 A1 | 11/2007 |
| EP | 1 906 208 A1 | 4/2008 |
| WO | WO 03/051671 A1 | 6/2003 |

* cited by examiner

METHOD OF PRODUCING A TOTAL IMAGE OF THE ENVIRONMENT SURROUNDING A MOTOR VEHICLE

CROSS-REFERENCE TO RELATED APPLICATIONS

This application is a continuation of PCT International Application No. PCT/EP2007/009587, filed Nov. 6, 2007, which claims priority under 35 U.S.C. §119 to German Patent Application No. 10 2006 052 779.8, filed Nov. 9, 2006, the entire disclosures of which are herein expressly incorporated by reference.

BACKGROUND AND SUMMARY OF THE INVENTION

The invention relates to a method of producing a total image of the environment surrounding a motor vehicle by using an image sensor device connected with the motor vehicle, which supplies image data in a first acquisition range of the vehicle environment.

Multiple methods of this type are known in the prior art. For example, image sensor devices are also known, where, for enlarging the effective acquisition range of the image sensor device, the individual pictures of several individual cameras are assembled to form a total image. International patent document WO 03/051671 A1 describes such an image sensor device using the example of a back-up camera.

For providing a large acquisition range of such an image sensor device, either very expensive wide-angle cameras have to be used or a sufficiently large number of individual cameras have to be arranged on the motor vehicle such that at least the combined number of individual acquisition ranges covers the total acquisition range desirable for a certain application. Very wide-angle camera systems usually have the disadvantage of considerable image distortions particularly in the edge regions of the image. The use of additional cameras, in addition to the often considerable costs for the cameras themselves as well as for suitable image processing on the output side, also has the disadvantage that, in many cases, a suitable mounting of the cameras on the motor vehicle is not easily achievable.

Particularly, the inclusion of the environment region situated in front of the vehicle front end into the acquisition range, for example, for the purpose of producing a complete panoramic-view image, requires the mounting of a camera on the vehicle front end. However, the mounting of a camera on the vehicle front end may be connected with design disadvantages and usually requires very high technical expenditures. A front-end camera must have a rugged design in view of the considerable external influences acting upon the vehicle front end and, under certain circumstances, may require a mechanical protection device. Providing a front-end camera is, therefore, technically difficult and, as a rule, costly.

Without a front-end camera, however, the acquisition range of the image sensor device that is obtained is not satisfactory for many applications. The same or similar problems exist with respect to the inclusion of the region of the surrounding environment situated behind the vehicle rear in the acquisition range, because also providing a rear camera on a motor vehicle, as a rule, requires high technical expenditures and may be connected with design-related disadvantages.

It is an object of the invention to provide a simple method by which a total image of the surrounding environment of a motor vehicle can be produced in a large acquisition range at low expenditures.

This object is achieved by a method of producing a total image of the surrounding environment of a motor vehicle by using an image sensor device connected with the motor vehicle, which supplies image data in a first acquisition range of the vehicle environment. At least a first image part of the total image is based on image data of the image sensor device from the first acquisition range. In addition to the image sensor device, a distance sensor device connected with the motor vehicle is used which supplies distance data in a second acquisition range of the vehicle environment. The second acquisition range covers an additional range of the vehicle environment which is not covered by the first acquisition range. At least a second image part of the total image, which is at least partially situated outside the first image part, is based on distance data of the distance sensor device from the additional range. Advantageous embodiments and further development of the invention are described herein.

According to the invention, a total, complete or full image is produced on the basis of image data of the image sensor device as well as on the basis of distance data of a distance sensor device provided in addition to the image sensor device. The distance sensor device that is used in addition to the image sensor device supplies distance data in an acquisition range or zone of the vehicle environment which differs from the acquisition range of the image sensor device. In particular, the acquisition range or zone of the distance sensor device covers an additional range or zone of the vehicle environment which is not covered by the acquisition range of the image sensor device. The distance data relating to this additional range can therefore be used for generating an additional image part in the total image, which represents the additional range. On the basis of the distance data of the distance sensor device for the additional range, the additional image part can visualize the distance relationships between the motor vehicle and objects in the vehicle environment and can promote an estimation of the risk potential in the additional range.

By way of the method according to the invention, a total image can be produced whose effective acquisition range exceeds the acquisition range of the image sensor device without requiring further image sensors, particularly cameras.

When the invention is appropriately implemented, the use of a distance sensor device can even achieve improved effective display precision in comparison to the use of very wide-angle cameras, because camera images taken with a wide angle are distorted considerably in the edge areas and are difficult to correct. The invention offers an elegant solution for "closing gaps" in camera-based monitoring of the vehicle environment, which is superior to an excessive development of the camera and image processing technology with respect to precision and cost.

The invention utilizes a distance sensor device. Distance sensor devices are currently widely available and are cost-effective. Particularly, with respect to the equipment, the distance sensor device used according to the invention can be implemented such that, without the presence of cameras, it can also be used independently as a distance generator for a driver assistance system. This further development makes it possible for vehicle manufacturers, for example, to offer their customers the distance sensor device as a basic equipment variant and to offer the expanded system operated according to the invention as optional equipment without having to modify the distance sensor device between the two variants with respect to the equipment.

According to a preferred embodiment of the method of the invention, the distance information concerning the additional range is converted to a virtual image of the additional range. The generating of the image part or sector representing the additional range can basically take place in the same or a similar manner as currently known for driver assistance systems functioning exclusively on the basis of a distance sensor system. For example, systems and methods are currently known by the name of "Park Distance Control" (PDC), in which a virtual image of the vehicle environment, possibly including an image of the vehicle itself, is generated from a bird's eye view. In this image, the regions of the vehicle environment are marked and, as necessary, divided into several distance stages by colors or in a different manner. The ultrasound-based detection of objects in these monitored regions of the vehicle environment has the result that, in the virtual image, the corresponding image regions are stressed by changes in the color and/or brightness. The presence of the objects is thereby visualized in the virtual image of the vehicle environment. In this fashion, the user of such a system or method is visually informed of distance data.

According to the invention, the total image is produced as a combination of the first image part or sector based on image data of the image sensor device and of the additional second image part or sector based on image data of the distance sensor device. If, for the production of the second image part, an image is available, which can be constructed, for example, as a virtual image of the vehicle environment—particularly of the additional range, the total image can be generated in a manner known per se by assembling the image parts. For example, in a panoramic view system, a virtual image of the front-end range based on distance data can then be integrated in the total image instead of the image of a front end camera (or its perspective transformation). In this case, the front end range represents the additional range according to the present invention.

In the total image, the transitions between the used partial images can be constructed as directly visible section edges. Technically, this is the simplest solution which, because of the different character of the individually image parts existing anyhow (typically real image or photo-realistic image in the case of the first image part vs. typically virtual image in the case of the second image part), results in only a slight impairment of the aesthetics of the total image.

Nevertheless, as an alternative, a soft fade-over between the partial images may be provided in order to avoid such visible section edges and to provide a soft visual transition between the first and the second image part in the total or overall image. Depending on the viewer's preference and degree of experience, this manner of display can let the total image appear clearer and have the effect of facilitating a viewer's intuitive interpretation. Under certain circumstances, this may also permit a more pleasing display format with respect to aesthetic aspects. Fade-over effects may have the same results at the edges of the image parts.

The partial images of the image sensor device and of the distance sensor device respectively overlap. Visible section edges can then be defined in a suitable manner—particularly in an aesthetically pleasing manner. Fadeovers are made possible only by an overlapping.

Another possibility of treating overlapping partial images of the image sensor device and of the distance sensor device respectively is the superimposition of the partial images. For example, in the overlapping area, a virtual image, which visualizes the distance information supplied by the distance sensor device, can be superimposed with high transparency on a photo-realistic image, which is generated on the basis of image date of the image sensor device. In the overlapping area, a photo-realistic image augmented by the distance information is thereby displayed to the user.

The invention should naturally also be considered to be advantageous to an unchanged extent when the partial images do not overlap or adjoin one another. For a better utilization of the video screen when the partial images do not adjoin one another, the intermediate regions, as required, can be displayed in reduced size in comparison to the covered ranges of the vehicle environment.

According to the invention, the image sensor device can include one or more cameras. When several cameras are used, the first image part of the total image, which is based on image data of the image sensor device, may be composed of several partial images of individual cameras. The distance sensor device preferably also includes several sensor components. The image parts according to the invention may each include one cohesive image region or several individual image regions.

Other objects, advantages and novel features of the present invention will become apparent from the following detailed description of one or more preferred embodiments when considered in conjunction with the accompanying drawings.

DETAILED DESCRIPTION OF THE DRAWINGS

A motor vehicle has an environment monitoring system, which is suitable for displaying a panoramic view of the vehicle environment from a bird's eye view on a monitor arranged in the motor vehicle interior. The total image of the panoramic view is produced on the basis of image data of two cameras and distance data of an ultrasound-based parking assistance system.

Figure 1:
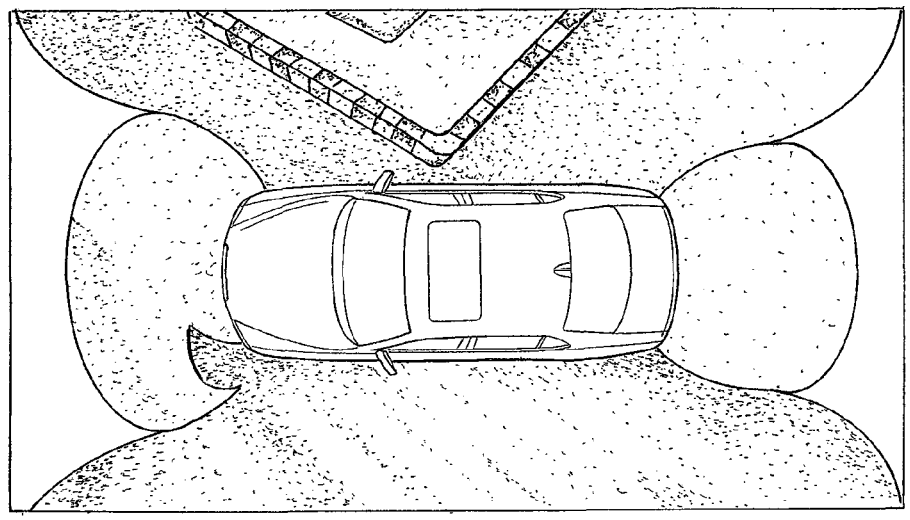
FIG. 1 is a view of a first embodiment of a total image of the surrounding environment of a motor vehicle, which includes a first image part based on camera images and a second image part based on distance data.

FIG. 1 illustrates a first embodiment of the total image which includes a first image part based on camera images and a second image part based on distance data.

Figure 2:
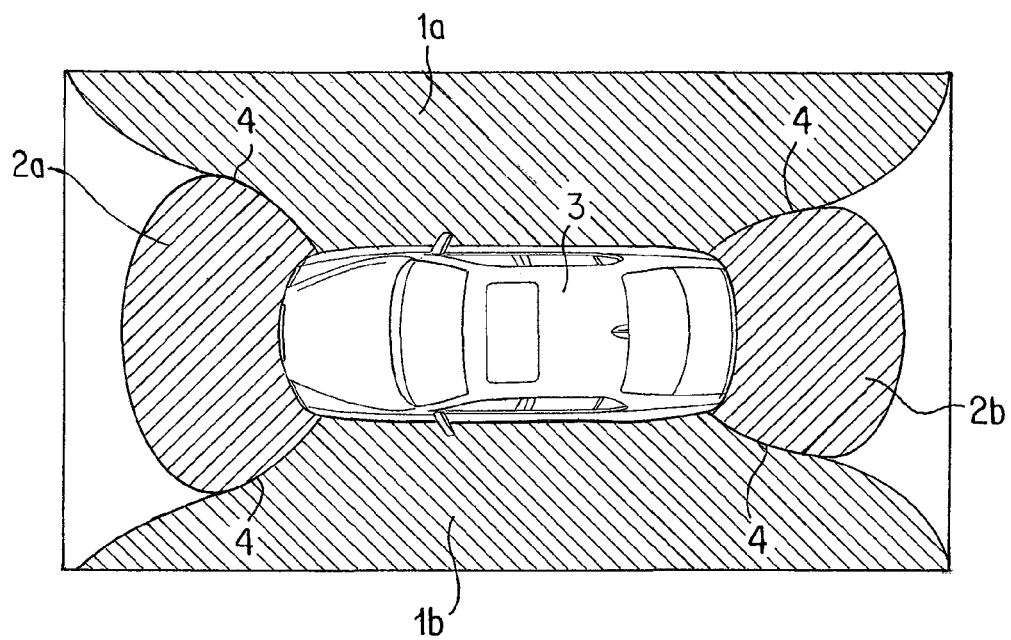
FIG. 2 is a structural outline of the same total image.

FIG. 2 shows a structural outline of the same total image. The first image part includes the image regions or zones 1a and 1b. Each of these image regions is essentially based on image data of a side camera of the motor vehicle. The images taken by the cameras are appropriately distorted or transformed in order to produce the virtual bird's eye perspective. The second image part includes the image regions or zones 2a and 2b. The display in these image regions essentially corresponds to that of distance visualizations known from the prior art. The total image also contains an image 3 of the motor vehicle itself.

In the case of the total image illustrated in FIG. 1, the image parts are separated by visible section edges 4 (see FIG. 2). Also, at the points at which the image parts do not adjoin one another, the displays are cut by visible section edges.

Figure 3:
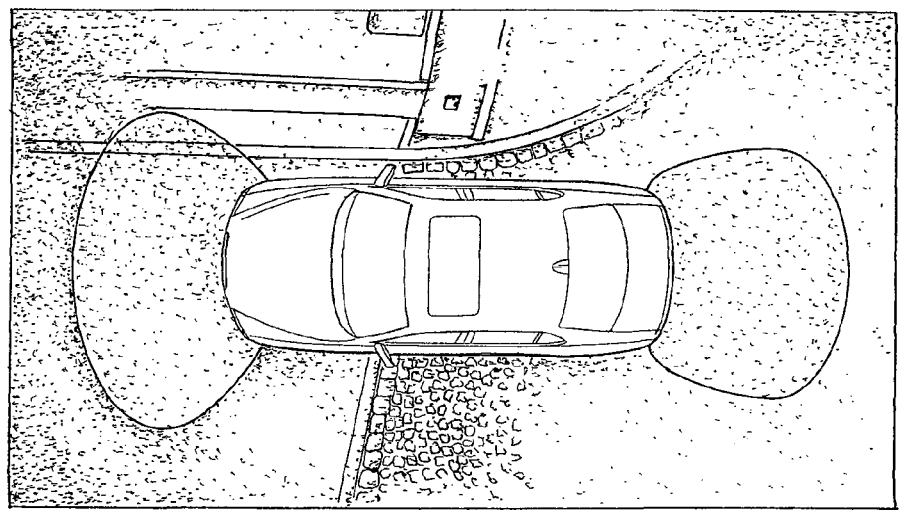
FIG. 3 is a view of a second embodiment of a total image of the surrounding environment of a motor vehicle, which comprises a first image part based on camera images and a second image part based on distance data.

In contrast, the first image part in the case of the total image illustrated in FIG. 3 is softly visually faded out. Depending on the viewer's preference and degree of experience, this can lead to a clearer design of the display and have the result that the latter can more easily be interpreted in an intuitive manner.

Figure 4:
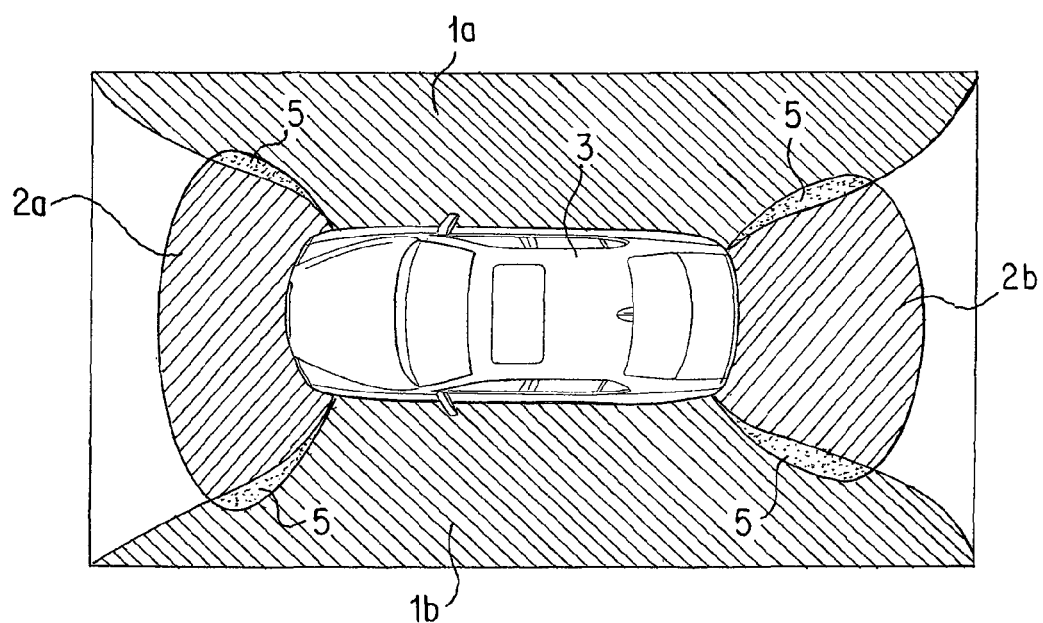
FIG. 4 is a structural outline of a total image according to a third embodiment with an overlapping first and second image part.

FIG. 4 is a structural outline of a total image according to a third embodiment, in which the first and second image parts overlap. Thus, for example, at the transition between the first image part (1a, 1b) and the second image part (2a, 2b), the first image part can be softly faded out and the second image part can be transparently superimposed partially on the first image part. In this manner, the image data of the cameras as well as the distance data of the ultrasound-based parking assistance system are represented in these regions, in which the two image parts overlap. In addition, this manner of representation, depending on the viewer's preference and degree of experience, can provide the total image with a clearer design and have the result that the latter can more easily be interpreted in an intuitive manner. FIG. 4 outlines the overlapping regions 5 between the first image part (1a, 1b) and the second image part (2a, 2b).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of displaying a birds-eye view of a surrounding environment of a motor vehicle, the method comprising:
    basing, by a processor-based environment monitoring system of the motor vehicle, at least a first image part of the birds-eye view on image data captured by an image sensor device arranged in the motor vehicle, the image sensor device capturing image data in a first acquisition range of the surrounding environment;
    basing, by the processor-based environment monitoring system, at least a second image part of the birds-eye view on distance data provided by a distance sensor device arranged in the motor vehicle, the distance sensor device providing distance data in a second acquisition range of the surrounding environment, wherein the second acquisition range and the first acquisition range correspond to different sides of the motor vehicle, and wherein the second image part is a virtual image generated from the distance data of the surrounding environment corresponding to the second acquisition range;
    generating, by the processor-based environment monitoring system, the birds-eye view from a plurality of image parts, including the first image part and the second image part, wherein each of the plurality of image parts incorporate only one of image data or distance data; and
    displaying, by the processor-based environment monitoring system on a monitor in the motor vehicle, the birds-eye view of the surrounding environment of the motor vehicle, wherein the first image part of the birds-eye view comprises only the image data captured by the image sensor device for the first acquisition range, and wherein the second image part of the birds-eye view comprises only the distance data provided by the distance sensor device for the second acquisition range, and wherein the first image part and the second image part are displayed as different regions of the birds-eye view with no more than an edge of the first image part overlapping with an adjacent edge of the second image part such that said edges of the first image part and the second image part form a partial overlapping region occurring between the first image part and the second image part.

2. The method according to claim 1, further comprising providing a soft visual transition between the first image part and the second image part in the birds-eye view of the surrounding environment of the motor vehicle.

3. The method according to claim 2, wherein the first acquisition range and the second acquisition range partially overlap, the method further comprising superimposing a virtual image that visualizes distance information provided by the distance sensor device in the partially overlapping region occurring between the first image part and the second image part on an image generated based upon the image data captured by the image sensor device.

4. The method according to claim 1, wherein the first acquisition range and the second acquisition range partially overlap, the method further comprising superimposing a virtual image that visualizes distance information provided by the distance sensor device in the partially overlapping region occurring between the first image part and the second image part on an image generated based upon the image data captured by the image sensor device.

5. The method of claim 1, wherein the surrounding environment comprises an area completely surrounding the motor vehicle.

6. The method of claim 1, wherein the second acquisition range corresponds to only the front and rear sides of the motor vehicle.

7. The method of claim 6, wherein the first acquisition range corresponds to only a driver side and passenger side of the motor vehicle.

8. In a motor vehicle having an image sensor device and a parking assistance system, a method for displaying a birds-eye view of a vehicle environment surrounding the motor vehicle, the method comprising:
    acquiring, by the image sensor device, at least a first image part of the birds-eye view based upon image data in a first acquisition range of the vehicle environment;
    acquiring, by a distance sensor device of the parking assistance system, at least a second image part of the birds-eye view based upon distance data in a second acquisition range of the vehicle environment, wherein the second acquisition range and the first acquisition range correspond to different sides of the motor vehicle, and wherein the second image part is a virtual image generated from the distance data of the vehicle environment corresponding to the second acquisition range;
    producing, by a processor-based environment monitoring system of the motor vehicle, the birds-eye view from a plurality of image parts, including the first image part and the second image part, wherein each of the plurality of image parts incorporate only one of image data or distance data; and
    displaying, by the processor-based environment monitoring system on a monitor in an interior of the motor vehicle, the birds-eye view of the vehicle environment, wherein the first image part of the birds-eye view comprises only the image data acquired by the image sensor device for the first acquisition range, and wherein the second image part of the birds-eye view comprises only the distance data acquired by the distance sensor device for the second acquisition range, and wherein the first image part and the second image part are displayed as different regions of the birds-eye view with no more than an edge of the first image part overlapping with an adjacent edge of the second image part such that said edges of the first image part and the second image part form a partial overlapping region occurring between the first image part and the second image part.

9. The method according to claim 8, wherein the distance sensor device supplies distance data using an ultrasound-based parking assistance system.

10. The method of claim 8, wherein the vehicle environment comprises an area completely surrounding the motor vehicle.

11. The method of claim 8, wherein the second acquisition range corresponds to only the front and rear sides of the motor vehicle.

12. The method of claim 11, wherein the first acquisition range corresponds to only a driver side and passenger side of the motor vehicle.

* * * * *